United States Patent [19]

Johnston

[11] Patent Number: 4,612,412

[45] Date of Patent: Sep. 16, 1986

[54] ELECTRICAL OUTLET BOX ASSEMBLY

[75] Inventor: James J. Johnston, Old Saybrook, Conn.

[73] Assignee: Brand-Rex Company, Willimantic, Conn.

[21] Appl. No.: 637,145

[22] Filed: Aug. 2, 1984

[51] Int. Cl.[4] .............................................. H02G 3/08
[52] U.S. Cl. .................................... 174/65 R; 174/57; 174/58
[58] Field of Search ................... 174/53, 58, 57, 65 R; 220/3.2, 3.7, 3.9, 3.94, 3.92; 339/103 R

[56] References Cited

U.S. PATENT DOCUMENTS

| | | | |
|---|---|---|---|
| 1,773,572 | 8/1930 | Calderwood | 174/65 R |
| 2,644,600 | 7/1953 | Senif | 220/3.9 |
| 3,365,156 | 1/1968 | Beck | 220/3.9 X |
| 3,834,658 | 9/1974 | Theodorides | 220/3.9 X |
| 3,862,351 | 1/1975 | Schindler et al. | 220/3.9 X |
| 4,062,470 | 12/1977 | Boteler | 220/3.9 X |
| 4,165,443 | 8/1979 | Figart et al. | 174/53 |
| 4,306,109 | 12/1981 | Nattel | 174/65 R X |

Primary Examiner—Arthur T. Grimley
Assistant Examiner—D. A. Tone
Attorney, Agent, or Firm—McCormick, Paulding & Huber

[57] ABSTRACT

A non-metallic outlet box assembly attached to an associated wall stud includes a pair of substantially identical, generally rectangular outlet boxes and a mounting bracket molded from resilient, high-impact, plastic material. Each outlet box is open at its front end and has top, bottom and side walls, at least portions of which converge toward one end of the box. The boxes are connected to each other and to the mounting member, by substantially parallel coengaging rails and channel members. The two outlet boxes are connected in snap-together assembly with each other and are incrementally adjustable in unison relative to the mounting member and a wall stud to which the mounting member is attached. Clamping members associated with cable receiving openings in each outlet box are adjustable to clamping positions wherein associated cables are clamped to the box to resist separation therefrom and to closed positions wherein each clamping member forms a substantial closure for an associated cable receiving opening.

6 Claims, 31 Drawing Figures

ELECTRICAL OUTLET BOX ASSEMBLY

BACKGROUND OF THE INVENTION

This invention relates in general to electrical outlet or junction boxes and deals more particularly with improvements in non-metallic outlet box assemblies.

In new building construction electrical outlet boxes are customarily installed before being wired and before wall material is applied. Such outlet boxes are usually nailed or otherwise fastened in fixed position to wall studs or the like, with proper allowance for the thickness of wall material to be later installed. The positioning of an outlet box is somewhat critical, since it generally determines the position of switches, receptacles or other electrical fixtures relative to the finished wall surface. Most outlet boxes heretofore available are not adapted for adjustment after installation. Any error in positioning such an outlet box must generally be compensated for by adjusting the positions of the electrical fixtures supported by the box. The mounting brackets on such fixtures are often provided with ears or the like for engaging marginal portions of the wall material which surrounds the wall outlet box opening. The ears cooperate with the marginal portions of the wall material to hold the fixture in proper position relative to the finish surface of the wall. However, such an arrangement is often not entirely satisfactory. When dry wall material is used, for example, the marginal portion of the material surrounding the outlet opening may lack the integrity to properly support the fixture.

Electrical codes generally require that the spacing between the outer surface of a wall and the frontal edges of an outlet box mounted within the wall must not exceed a specified dimension. If panelling is applied to the wall without repositioning the outlet box, the resulting structure may be in violation of the applicable code.

Since outlet boxes are usually secured in position before associated wiring is installed, it is often necessary for an electrician making the installation to work in close quarters or in awkward or uncomfortable positions to wire the outlet boxes, which may appreciably increase the time required to complete wiring installation.

When two or more outlet boxes are installed in side-by-side or stacked relationship to each other it is often necessary to remove a side wall from each of the boxes and connect the boxes to each other to form a larger box having a single chamber for containing all of the wiring to be terminated at the box location. However, this box arrangement is unacceptable for some purposes, as for example, where an electrical service cable and telephone, CATV and/or low voltage control conductors, which require physical separation from the electrical service cable, are terminated at a common location.

Electrical codes also generally require that electrical service cables be secured to associated outlet boxes to resist separation therefrom. For this purpose, most outlet boxes employ some form of clamping member secured by a threaded fastener or the like. The time required to secure the cables to each outlet box represent a significant portion of the overall time required to complete wiring installation.

When it becomes necessary to add to a service a single outlet box or a plurality of boxes arranged in stacked relationship after wall material is in place, problems are often encountered in fastening each box in position and in adjusting each box, as necessary, without damaging surrounding wall material.

The present invention is concerned with the aforedescribed problems. Specifically, it is the general aim of the present invention to provide improved non-metallic stackable electrical outlet box assemblies for rapid, accurate installation and which may, if necessary, be adjustably positioned after installation and relative to an associated wall.

SUMMARY OF THE INVENTION

In accordance with the present invention an improved non-metallic electrical outlet box assembly comprises at least one outlet box member and a mounting member for releasably securing the outlet box member to an associated stud or the like. The one outlet box member has a plurality of walls including a top wall, a bottom wall, a pair of opposing side walls connected to and extending between the top and bottom wall. A rear wall cooperates with the top, bottom and side walls to define a generally rectangular box which has a frontal opening. Fastening means are provided for releasably securing an electrical fixture to the box. A means is also provided for connecting the one outlet box to the mounting member for movement to a plurality of positions relative to the mounting member and an associated stud. A retaining means releasably secures the one outlet box member to the mounting member in a selected one of the positions.

BRIEF DESCRIPTION OF THE DRAWINGS

FIG. 10 is a somewhat enlarged fragmentary front view of the outlet box, as it appears in FIG. 5.

FIG. 14 is a somewhat enlarged fragmentary left side elevational view of the outlet box as it appears in FIG. 8.

DETAILED DESCRIPTION OF PREFERRED EMBODIMENTS

In accordance with the invention, an outlet box assemby essentially comprises a mounting member for attachment to an associated wall stud or the like and at least one electrical outlet box member releasably connected to the mounting member for adjustable positioning relative to the mounting member and to an associated wall stud to which the mounting member is attached.

Turning now to the drawings, a non-metallic outlet box assembly embodying the present invention and indicated by the reference numeral 10 is shown secured to a wall stud 12. The illustrated assembly 10 includes a mounting member or bracket, indicated generally at 14, attached to the stud 12 and a pair of substantially identical outlet members 16, 16 stacked in side-by-side relation to each other and connected to the mounting bracket 14, as will be hereinafter more fully discussed, An electrically grounded duplex electrical plug receptacle, indicated by the numeral 18, is mounted on one of the outlet boxes 16, 16. The other of the illustrated outlet boxes provides support for a CATV/telephone adaptor 20 which includes a modular phone jack 22 and a coaxial cable bulkhead connector 24.

Figure 2:
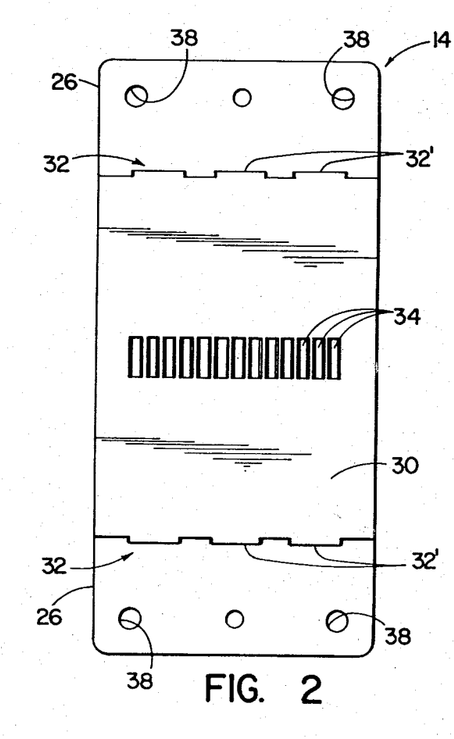
FIG. 2 is a somewhat enlarged side elevational view of the mounting member shown in FIG. 1.
Figures 3, 4:
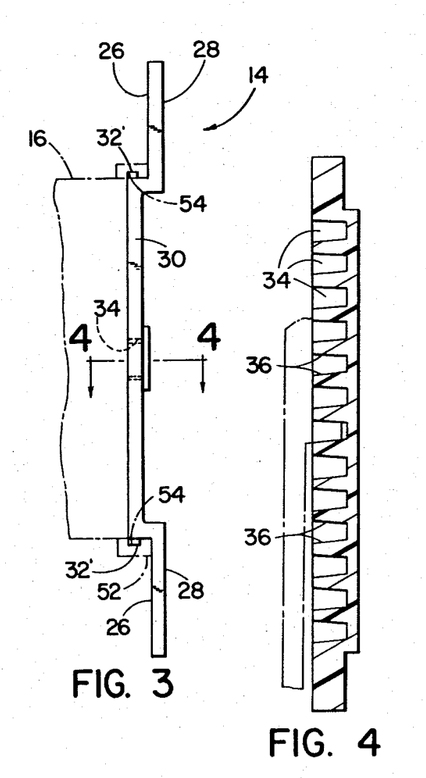
FIG. 3 is a front view of the mounting member of FIG. 2, an associated outlet box connected to the mounting member being shown in broken lines.
FIG. 4 is a somewhat enlarged sectional view taken along the line 4—4 of FIG. 3.

Considering now the illustrated mounting bracket 14 in further detail and referring particularly to FIGS. 2-4, the mounting bracket comprises a generally rectangular member of substantially uniform wall thickness molded from resilient, high impact, heat-resistant, dielectric plastic material. It includes a base formed by substantially identical upper and lower end portions 26, 26 which define mounting surfaces 28, 28 disposed within a common plane. A central portion of the bracket indicated at 30 is laterally offset from the end portions, as best shown in FIG. 3. Substantially parallel horizontally extending upper and lower rails, indicated generally at 32, 32, project above and below the central portion 30 in laterally outwardly spaced relation to the end portions 26,26 as best shown in FIG. 3. The rails may be continuous, however, to facilitate convenient molding each of the illustrated rails is defined by a plurality of spaced apart rail segments 32′, 32′ shown in FIG. 2. A series of horizontally spaced apart laterally outwardly opening retaining recesses 34, 34 are formed in the central portion 30 for a purpose which will be hereinafter further evident. Each recess is partially defined by a pair of opposing vertically disposed walls 36, 36 which diverge outwardly toward the open end of the recess. Apertures 38, 38 formed in the end portions 26, 26 enable the mounting bracket 14 to be nailed or otherwise fastened to the side of an associated stud, such as the stud 12.

A typical outlet box 16, shown in FIGS. 5-15 is molded from resilient, high impact, heat-resistant, dielectric plastic material and has a top wall 40, a bottom wall 42, right and left side walls, respectively indicated at 44 and 46, and a rear wall 48 which cooperates with the top, bottom and side walls to form a generally rectangular box open at its front end. The top, bottom and side walls of the outlet box 16 are preferably formed with an approximate 1 percent draft (0.017 inch taper per inch) to facilitate mold release. Preferably, and as shown, at least the rear portion of the top, bottom and side walls converge toward the rear wall 48 from a parting line, indicated at 50 and best shown in FIGS. 6-8, which lies within a plane parallel to the front edges of the outlet box and spaced rearwardly from the front edges. The forward portions of the top, bottom and side walls converge in a forward direction from the parting line 50 toward the front edges of the outlet box, substantially as shown. A pair of integral substantially parallel upper and lower channel member 52, 52 project from the upper and lower ends of the right side wall 44 and extend rearwardly from the parting line 50 along the upper and lower marginal portions of the side wall 44, substantially as shown. The channel members 52, 52 cooperated with the side wall 44 to define a pair of opposing generally parallel channels 54, 54. The channels extend through the channel members, have cross-sections substantially complementing the cross-sections of the rails 32, 32, and provide means for connecting the outlet box 16 to the mounting bracket 14 or to another outlet box of like kind, as will be hereinafter further discussed.

A pair of integral, substantially parallel mounting rails 56, 56 project above and below the opposite side wall 46 and extend along the upper and lower marginal portions of that side wall, as best shown in FIGS. 5-7 and 9. Each rail 56 has a cross section which substantially complements the cross section of an associated channel 54. The rails 56, 56 are adapted to be received within and substantially complement the channels 54, 54 of another electrical outlet box 16 to facilitate connection of the boxes in stacked relationship to each other.

Figures 13, 15:
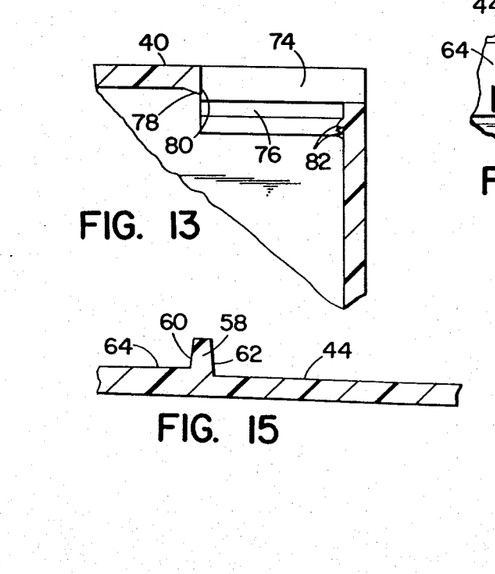
FIG. 13 is similar to FIG. 12, but shows the outlet box with the clamping member removed.
FIG. 15 is a fragmentary sectional view taken along the line 15—15 of FIG. 14.

The outlet box 16 is arranged for snap together assembly with an associated mounting bracket 14 and for this purpose the outlet box 16 includes an integral retaining member or lug 58 which projects laterally outwardly from a central portion of its right side wall 44. The illustrated lug 58, best shown in FIGS. 14 and 15, is adapted to be received in snap fit engagement within and complement an associated retaining recess 34 when the outlet box 16 is assembled with an associated mounting bracket 14. The lug 58 has a generally rectangular cross-section and is partially defined by vertically disposed forwardly and rearwardly facing surfaces indicated at 60 and 62, respectively, which converge laterally outwardly from the side wall 44, substantially as shown. A ramp surface 64 extends from the parting line 50 to the forwardly facing surface 60 in generally parallel alignment with the channels 54, 54, for a purpose which will be hereinafter further evident.

The outlet box 16 is also arranged for snap together assembly in stacked relationship with another outlet box of like kind and for this reason a generally rectangular aperture 66 extends through a central portion of the side wall 46 opposite the retaining lug 58. The aperture 66 is adapted to receive the retaining lug 58 on the other outlet box in snap fit engagement therein when the two outlet boxes are connected together in stacked relationship to each other. The retaining lug 58 is also adapted to cooperate with an associated one of the retaining apertures 34, 34 to releasably retain the outlet box 16 in a selected position of adjustment relative to the mounting member 14, as will be hereinafter further described.

A pair of mounting ears 68, 68 project from the upper and lower walls 40 and 42 proximate the parting line 50 for securing to the outlet box an associated electrical fixture, such as the electrical receptacle 18. Each mounting ear 68 has an axially rearwardly extending fastener receiving bore 70. A plurality of integral angularly spaced, resilient tabs 72, 72 project inwardly from the wall of the bore 70. The tabs 72, 72 are constructed and arranged to engage and grip threads on an associated threaded fastener (not shown) when the fastener is coaxially forceably inserted into the bore 70.

Figure 5:
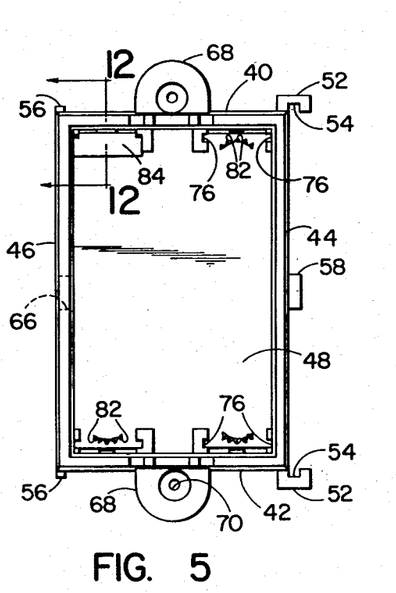
FIG. 5 is a somewhat enlarged front view of one of the outlet boxes shown in FIG. 1.
Figure 6:
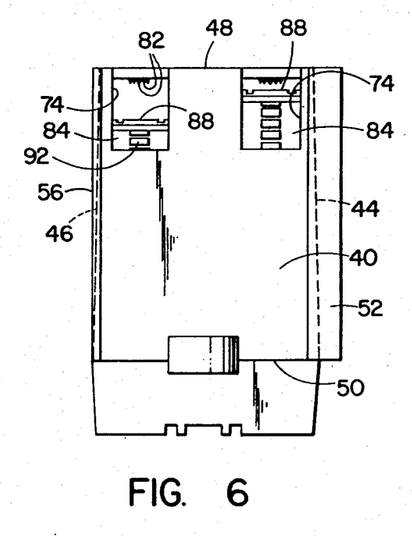
FIG. 6 is a top view of the outlet box.
Figure 7:
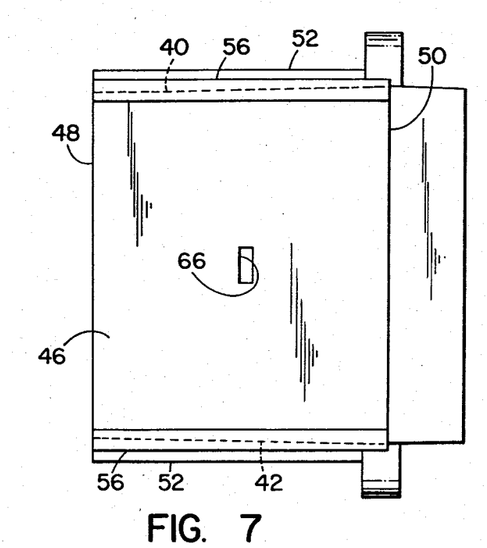
FIG. 7 is a left side elevational view of the outlet box shown in FIG. 5.
Figure 8:
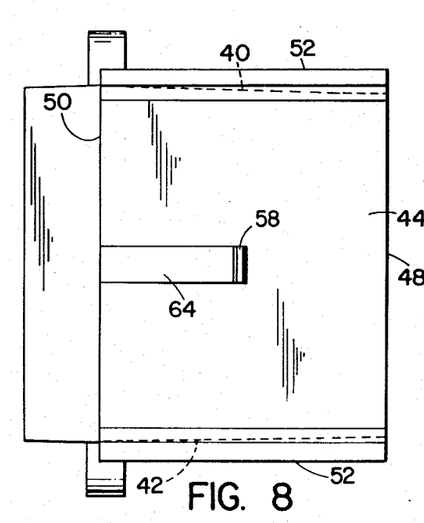
FIG. 8 is a right side elevational view of the outlet box.
Figure 9:
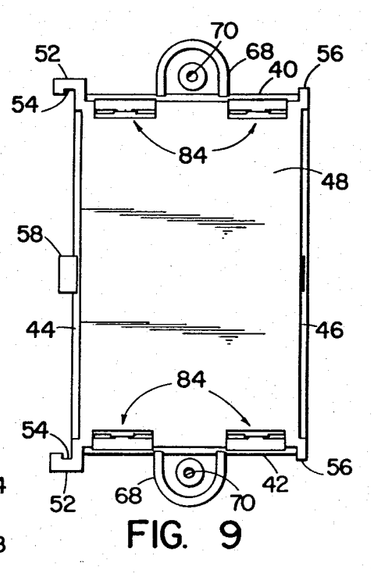
FIG. 9 is a rear view of the outlet box.
Figure 11:
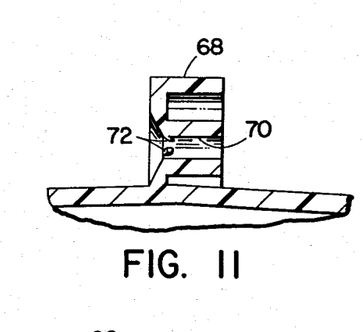
FIG. 11 is a fragmentary sectional view taken along the line 11—11 of FIG. 10.
Figures 12, 16:
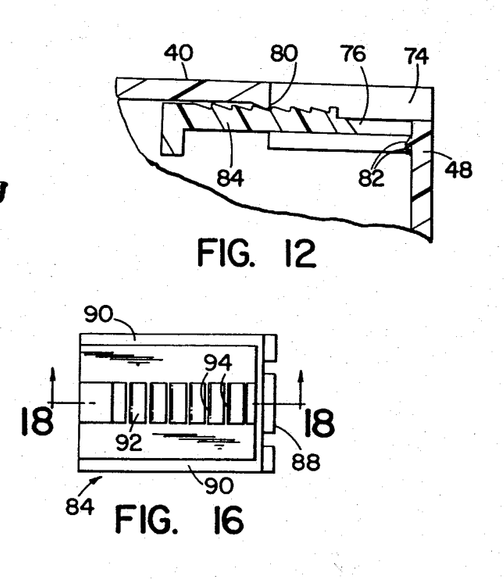
FIG. 12 is a somewhat enlarged fragmentary sectional view taken along the line 12—12 of FIG. 5.
FIG. 16 is a top view of the clamping member shown in FIG. 12.

Further considering the outlet box 16, a plurality of generally rectangular cable receiving openings 74, 74 are formed in the upper and lower walls 40 and 42. Preferably, and as shown, each opening 74 is partially defined by an associated frontal portion of the rear wall 48, as best shown in FIG. 6. A pair of opposing inwardly opening channels 76, 76 extend along opposite sides of each cable receiving opening 74, as best shown in FIGS. 5 and 13. A locking tooth 78 projects inwardly from the wall of outlet box adjacent the forward edge of each opening 74, as best shown in FIG. 13. Each locking tooth 78 is defined by a forwardly facing rearwardly and inwardly inclined surface which terminates at a rearwardly facing tooth surface 80 substantially perpendicular to an associated wall of the outlet box. A plurality of cable gripping or incising teeth 82, 82 integrally formed on the rear wall 48 project from the frontal surface of the rear wall proximate each cable receiving opening 74, as best shown in FIGS. 5, 12 and 13.

Figure 17:
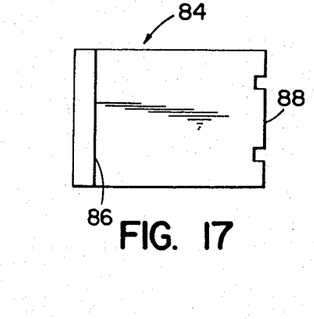
FIG. 17 is a bottom view of the clamping member of FIG. 16.
Figure 18:
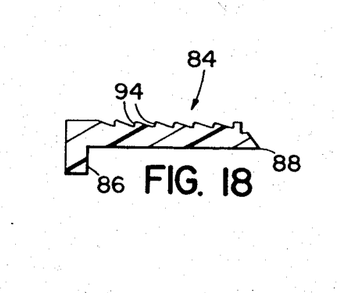
FIG. 18 is a sectional view taken along the line 18—18, of FIG. 16.

A clamping member indicated generally at 84 is associated with each cable receiving opening 74. A typical clamping member 84, shown in FIGS. 16–18, is molded from resilient, high impact, heat-resistant plastic material and has a generally rectangular body. An integral tab 86 projects inwardly from the forward end of the body, as best shown in FIGS. 12 and 18. A rearwardly and inwardly inclined surface at the rear end of the body terminates at the inner surface of the clamping member to define a relatively sharp rearwardly facing incising edge 88. The marginal side portions of the clamping member, indicated at 90, 90, are relieved to substantially complement the channels 76, 76. A saw tooth locking element 92 which includes rearwardly extending series of individual locking teeth projects from the outer surface of the clamping member. The teeth of the locking element are arranged to cooperate in locking engagement with an associated locking tooth 78. Each tooth on the locking element is defined by a rearwardly facing forwardly and outwardly inclined surface and a forwardly facing locking surface 94 which is substantially perpendicular to the body of the clamping member 84.

Each clamping member 84 is assembled with the outlet box 16 with its marginal edges 90, 90 received within the channels 76, 76 of an associated cable receiving openings 74. Preferably, and as illustrated by the clamping member 84 shown at the left in FIG. 6, the rearwardmost locking element or tooth of the locking element 92 is engaged with the locking tooth 78 before the outlet box 16 is installed so that the clamping member is secured in assembly with the outlet box in an open or cable receiving position. Thus, the associated cable receiving opening 74 is exposed, so that a cable may be freely inserted into the outlet box through the latter opening.

Figure 1:
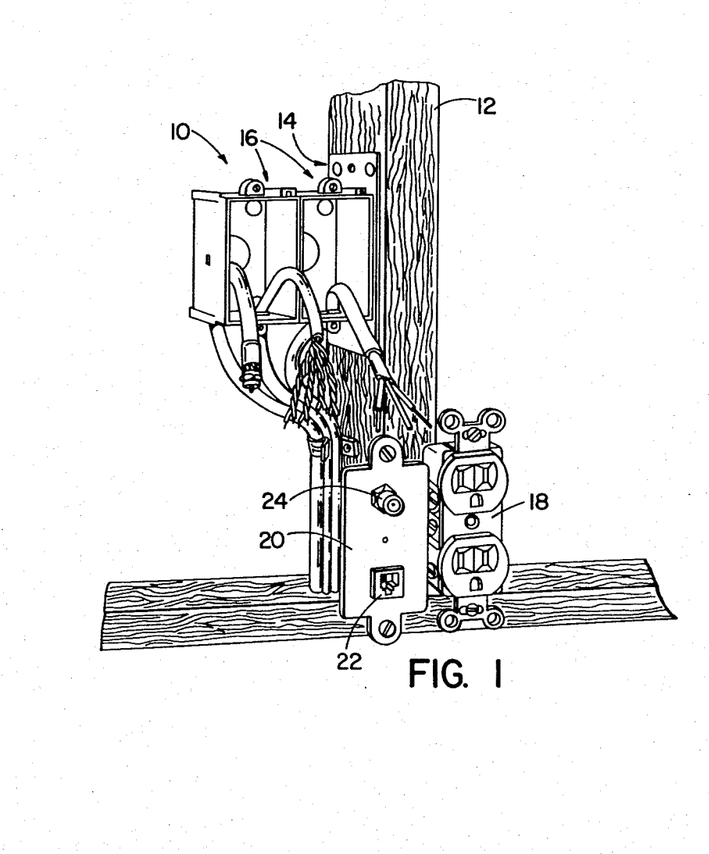
FIG. 1 is an exploded fragmentary perspective view and shows an outlet box assembly embodying the present invention attached to a wall stud.

In making an outlet box assembly, such as shown in FIG. 1, the mounting bracket 14 is first fastened to an associated stud, such as the stud 12, at the proper distance above the finished floor. The mounting bracket is secured with nails or other suitable fasteners which extend through the apertures 38, 38.

The rear ends of the channels 54, 54 on an associated outlet box 16 are engaged with the forward ends of the rails 32, 32 on the secured mounting bracket 14. The outlet box may now be slid rearwardly along the rails onto the mounting bracket until the retaining member 58 engages the forward edge of the mounting bracket central portion 30. Thereafter, squeezing pressure is applied to the opposite side walls 44, and 46 to bow the side walls slightly inwardly and allow the retaining member 58 to pass the forward edge of the mounting bracket 14. Further rearwardly movement of the outlet box relative to the mounting bracket causes the retaining member 58 to snap into engagement with the forwardmost retaining recess 34 to releasably lock the outlet box in assembly with the mounting bracket. Further adjustment of the outlet box relative to the mounting bracket may be effected by inserting a screwdriver blade or the like between the ramp surface 64 on the outlet box member and the associated surface of the mounting member to spread the two resilient members apart relative to each other and separate the retaining member 58 from engagement within an associated retaining recess 34. Thereafter, the outlet box 16 may be incrementally adjusted relative to the mounting bracket 14 by moving it rearwardly relative to the mounting bracket until the retaining member 58 engages a selected one of the retaining recesses 34, 34 to releasably secure the outlet box in a selected position of adjustment relative to the mounting bracket 14 and the associated stud to which the bracket is attached. Thus, the front edges of the outlet box 16 may be accurately positioned forward of the frontal surface of the stud a distance substantially equal to the thickness of the wall material to be installed.

If the assembly is to include two or more stacked outlet boxes, the rails 56, 56 on the first or mounted outlet box are engaged within the rear ends of the channels 54, 54 on a second outlet box 16 to be joined with or stacked on the first box. The second box is then slid rearwardly along the rails of the first box until the retaining member 58 on the second box engages the frontal edge of the first box. Thereafter, squeezing pressure is applied to the side walls 44 and 46 of the second box to bow inwardly the side wall 44 of the second box and allow the retaining member 58 to pass the front edge of the side wall 46 on the first box. The second box is now moved rearwardly relative to the first box until the retaining member 58 snaps into engagement with the retaining recess 66 of the first box. In like manner one or more additional boxes may be stacked to complete a required outlet box assembly.

Ordinarily, an outlet box assembly is mounted on a stud before being wired. Each electrical cable which comprise the wiring is inserted into an associated outlet box through the associated cable receiving openings 74 in the outlet box. The individual conductors which comprise each cable may be stripped, either before or after the cable has been inserted into an outlet box. The illustrated box 16 has four cable receiving openings 74, 74 to accommodate four individual electrical cables, however, fewer cables may be connected to each box, as required.

After an electrical cable has been inserted into an associated outlet box and a desired length of cable exposed within the box, the clamping member 84 associated with the cable is moved to its clamping position by applying rearwardly directed pressure to the tab 86 at the forward end of the clamping member 84 to cause teeth of the saw tooth locking element 92 to snap over the locking tooth 78. Sufficient force is applied to the tab 86 to cause the teeth 82, 82 on the rear wall 48 and the relatively sharp edge 88 on the clamping member to incise and grip the cable so that the cable will resist separation from the outlet box 16 in response to axial force applied to the cable in a direction away from the box after the cables have been clamped in place, the clamping member 84, 84 associated with the unused cable receiving openings 74, 74 are pushed to closed position to provide closures for the unused openings.

Occasionally it may be desirable to connect electrical cables to the outlet box or boxes which comprise an assembly before connecting the box or boxes to an associated mounting bracket. Where such procedure is desired it should now be apparent that it may be employed without difficulty.

After an electrical ,fixture, such as the receptacle 18 has been electrically connected and properly grounded to the cable, the fixture is positioned on the box adjacent the forward edges of the box, in a convenient manner. Conventional threaded fasteners used to secure the fixture are coaxially inserted into and forced rearwardly within the bores 70, 70. The resilient tabs 72, 72 within each bore 70 allow an associated threaded fastener to be pushed into retaining position within the bore. The tabs 72, 72 engage and grip threads on each fastener to prevent retrograde movement of the fastener. Thereafter, the fasteners may be rotated and tightened in a conventional manner, as necessary, to firmly secure the fixture to the outlet box.

Figures 19, 20, 21, 22, 23, 24, 25:
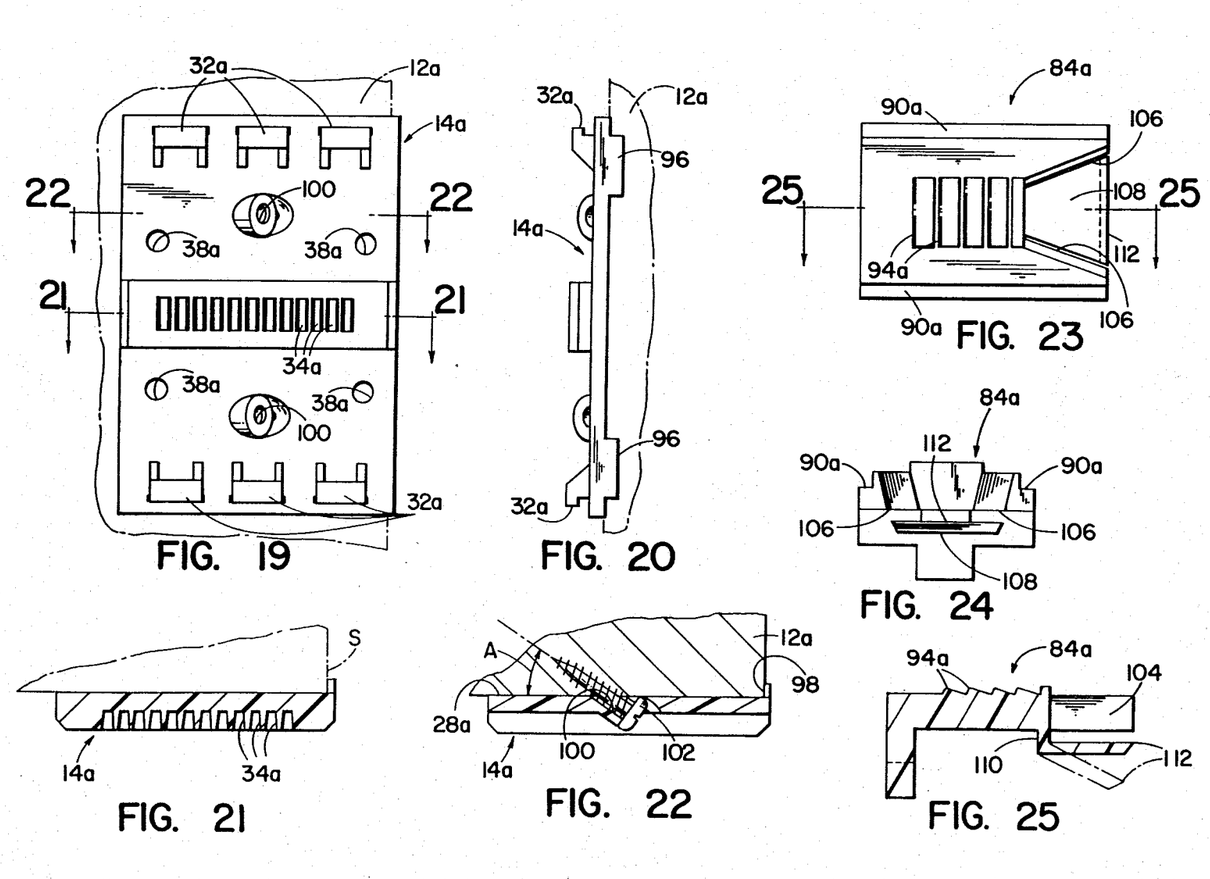
FIG. 19 is a side elevational view of another mounting member embodying the invention and shown in connected relation to a stud indicated by broken lines.
FIG. 20 is a front elevational view of the mounting member and stud shown in FIG. 19.
FIG. 21 is a sectional view taken along the line 21—21 of FIG. 19.
FIG. 22 is a fragmentary sectional view taken along the line 22—22 of FIG. 19, and shows the mounting bracket fastened to an associated stud.
FIG. 23 is a top view of another clamping member embodying the present invention.
FIG. 24 is a rear end view of the clamping member shown in FIG. 23.
FIG. 25 is a sectional view taken along the line 25—25 of FIG. 23.

It is sometimes desireable or necessary to install a wall outlet box assembly after wall material is in place, as for example, in an existing building. In FIGS. 19–22 there is shown a wall mounting member or bracket indicated generally 14a and particularly adapted for such installation. The mounting bracket 14a is preferably molded from resilient, high impact, heat-resistant, plastic material and comprises a generally rectangular plate for mounting adjacent the side of an associated stud such as the stud indicated at 12a and shown in broken lines. Preferably, the mounting member 14a has a vertical dimension not greater than the vertical dimension of an associated outlet box 16 and includes a substantially flat mounting surface 28a. A pair of vertically spaced apart locating tabs 96, 96 project laterially from the mounting surface 28a and define rearwardly facing locating surfaces 98, 98 for engaging associated forwardly facing marginal portions of an associated stud, such as the stud 12a. The central portion of the plate defines a series of retaining recesses 34a, 34a substantially identical to the recesses 34, 34, previously described. The mounting bracket 14a also includes upper and lower mounting rails, each defined by a plurality of spaced apart rail segments 32a, 32a. A plurality of mounting bores 100, 100 extend through the mounting bracket, as best shown in FIGS. 19 and 22. Each bore 100 is inclined rearwardly and in the direction of the mounting surface, as best shown in FIG. 22. The axes of the bores 100, 100 preferably form 45 degree angles with the mounting surface 28a, as indicated at A in FIG. 22. An associated threaded fastener 102 is preferably engaged within each of the mounting bores. A plurality of fastener receiving apertures 38a, 38a are also formed in the mounting bracket 14a as best shown in FIG. 19.

The mounting bracket 14a may be used to mount an outlet box assembly on an associated stud before wall material has been applied, however, it is particularly adapted for installing one or more outlet box assemblies on an existing wall structure. If the wall material has not yet been applied, the mounting bracket 14a may be secured to the side of an associated stud using nails or other suitable fasteners which extend through the apertures 38a, 38a. The locating tabs 96, 96 engage associated portions of the frontal surface of the stud 12a and aid in properly positioning the mounting bracket relative to the stud.

When the mounting bracket 14a is to be used to install an outlet box assembly 16 within an existing wall, an opening is first cut in the wall generally adjacent an associated stud to generally complement the shape of the associated outlet box assembly to be installed within the opening. The fastening screws 100 are retracted from the mounting bracket 14a so that the ends of the screws are disposed generally within the plane of the mounting surface 28a. The mounting bracket 14a is then positioned within the wall opening (not shown) adjacent one side of an associated stud with the locating tab surfaces 98, 98 generally engaged with associated frontal surface portions of the stud. While the mounting bracket is held in the latter position, the threaded fasteners 100, 100, which are preferably self-tapping screws, are driven into the stud 12a to secure the mounting bracket 14a in fixed position to the stud. The required electrical cables are preferably inserted into the outlet box before the outlet box is connected to the mounting bracket 14a in the manner hereinbefore described. If a second outlet box is to be provided as part of the assembly, the second box is preferably installed on the first box after the first box has been attached to the mounting bracket. The electrical cables may then be pulled into the outlet box or boxes to take up any cable slack which may have been provided to facilitate assembly, after which the cable clamping members associated with the cables are forced into clamping engagement with the cables. The remaining clamping members associated with the unused cable receiving openings are then pushed to closed position to complete the assembly.

If paneling is installed on an existing wall containing an outlet box assembly of the aforedescribed type, the position of the outlet box assembly may be adjusted to compensate for the change in thickness of the wall resulting from the addition of the paneling. The required adjustment is made by inserting a tool such as a screwdriver blade or the like into the space between the mounting member 14a and the associated outlet box wall 44. The tool is then used to spread the resilient members apart a suffficient distance to disengage the retaining member 58 from its associated retaining recess 34a. The outlet box or stacked boxes attached to the mounting member may then be moved outwardly to a position of proper alignment relative to the surface of the wall, after which the tool is removed to allow snap engagment between the retaining lug 58 on the outlet box and an associated retaining recess 34a to lock the outlet box in a selected position of adjustment relative to the wall.

Referring now to FIGS. 23-25 another clamping member embodying the present invention is indicated generally by the reference numeral 84a. The clamping member 84a is similar in some respects to the clamping member 84, previously described. However, the clamping member 84a includes means for increasing the clamping force applied to and associated electrical cable to retain it in assembly with an associated outlet box in response to axial force applied to the cable in a direction away from the outlet box. Like the clamping member 84, the clamping member 84a has a generally rectangular body and relieved opposite side edge portions 90a, 90a adapted to be received within a pair of associated channels 76, 76. However, the rear edge portion of the clamping member body is cut out to form a rearwardly diverging notch 104 which has relatively sharp opposing edges 106, 106 for incising and gripping an associated electrical cable engaged within the notch. The clamping member 84a further includes a clamping element 108 which generally complements the shape of the notch 104. The clamping element is integrally connected at its forward end to the forward end of the notch by a live hinge 110. The clamping element 108 forms a substantial closure for the notch 104 and has a rear edge 112 which is preferably relatively sharp for incising an associated insulated electrical cable. The clamping member 84a is attached to an associated outlet box in the same manner as the previously described clamping member 84.

The clamping member 84a is preferably positioned on an outlet box 16 so that insertion of a cable into an associated cable receiving opening 74 deflects the clamping element 108 toward or to a position such as its broken line position of FIG. 25. Thereafter, further movement of the clamping member toward its clamping position causes the sharp rear edge 112 and the associated sharp edges 106, 106 to incise and grip the insulated cable. Force is applied to the cable in the direction of the cable axis and away from the outlet box will cause the clamping element to pivot about its live hinge 110 in clockwise direction and toward its full line position of FIG. 25 thereby forcing the cable more tightly against the rear wall 48 and increasing the holding force applied to the cable by the clamping member. Thus, resistance to separation of the cable from the outlet box increases.

Figures 26, 27, 28, 29, 30, 31:
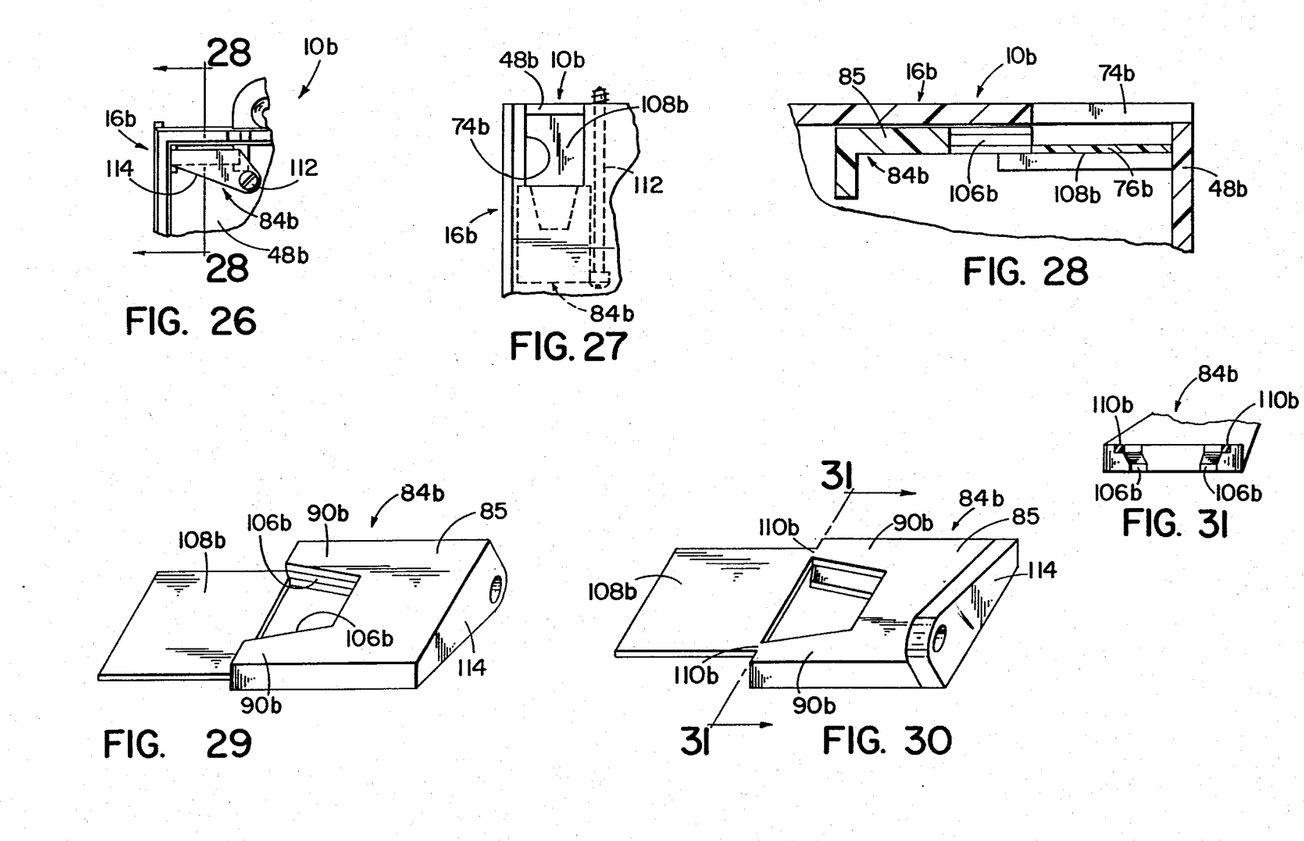
FIG. 26 is a fragmentary front view of another outlet box embodying the invention.
FIG. 27 is a fragmentary top view of the outlet box shown in FIG. 26.
FIG. 28 is a somewhat enlarged fragmentary sectional view taken along the line 28—28 of FIG. 26.
FIG. 29 is a somewhat enlarged perspective view of the clamping member of FIGS. 26-28 as viewed from its outer side.
FIG. 30 is a perspective view of the clamping member of FIG. 29 as viewed from its inner side.
FIG. 31 is a somewhat further enlarged sectional view taken along the line 31—31 of FIG. 30.

In FIGS. 26-28 another outlet box assembly embodying the invention is indicated generally by the reference 10b. The outlet box assembly 10b is similar in some respects to the outlet box assembly 10 previously described and includes an outlet box 16b which has a plurality of cable receiving openings 74b, 74b (one shown). The assembly further includes the clamping member 84b associated with each cable receiving opening and which differs somewhat from the clamping members 84 and 84a previously described. More specifically, the clamping member 84b includes means for maintaining an associated cable receiving opening 74b in closed position until the opening is used to connect an electrical cable to the outlet box 16b. Like the previously described clamping members, the clamping member 84b has a generally rectangular body portion, indicated at 85 which includes opposite side edge portions 90b, 90b adapted to be received within associated channels formed on the outlet box. Trapazoidally-shaped cutout is formed in the body portion or the clamping member and defined by rearwardly diverging opposing edges 106b, 106b. The latter edges are preferably blunt or relatively dull. A generally rectangular air cap 108b is attached to the rear end of the body portion at regions of weakening, indicated at 110b, 110b. The air cap 108 has a width dimension slightly smaller than the width dimension of an associated cable receiving opening 74b, as best shown in FIG. 27. A fastener 112, which is preferably of a self-tapping type, passes through a tab 114 which extends inwardly from the forward end of the body portion and threadably engages the outlet box rear wall 48b for securing the clamping member 84b in assembly with the outlet box.

The air cap 108b normally provides a closure for the cable receiving opening 74b, as best shown in FIG. 27. However, the air cap 108b is adapted to be broken away from the body portion 85 at the regions of weakening 110b, 110b to facilitate insertion of a cable into the outlet box. The air cap may be broken off by an inwardly directed force applied to the cap through the cable receiving opening 74b and may in fact be broken away by inserting a cable into the opening. When the cable is properly positioned within the outlet box the fastener 112 is threaded into the rear wall 48b to bring the clamping member into clamping engagement with the cable. In clamping position the dull edges 106b, 106b bear against and tightly grip the insulated cable to hold it in assembly with the box so that it resists separation from the box.

I claim:
1. A non-metallic electrical outlet box assembly comprising at least one outlet box and a mounting member for releasably securing said one outlet box to an associated stud, said one outlet box having a plurality of walls including a top wall, a bottom wall, a pair of opposing side walls connected to and extending between said top wall and said bottom wall, and a rear end wall cooperating with said top wall, said bottom wall and said side walls to define a generally rectangular outlet box for receiving an electrical fixture therein and having a frontal opening, a cable receiving opening defined at least in part by one of said walls, and a cable clamping member supported on said outlet box and associated with said cable receiving opening, said clamping member having a body portion and including an air cap attached to said body portion at region of weakening, said cable clamping member being movable relative to said outlet box from a cable receiving position to a clamping position wherein said clamping member clampingly engages a cable extending through said cable receiving opening to resist separation of the cable from said outlet box in response to force applied to the cable in a direction away from said outlet box, said air cap forming a closure for said cable receiving opening when said clamp- ing member is in its cable receiving position, said air cap being adapted to break away from said body portion in response to inwardly directed force applied to said air cap, securing means for retaining said clamping member in said clamping position, fastening means for releasably securing an electrical fixture to said one outlet box, connecting means for attaching said one outlet box to said mounting member for movement to a plurality of positions relative to said mounting member and an associated stud to which said mounting member may be attached, and retaining means for releasably securing said one outlet box to said mounting member in a selected one of said positions.

2. A non-metallic electrical outlet box as set forth in claim 1 wherein said securing means comprises a threaded fastener extending through said clamping member and threadably engaging a wall of said outlet box.

3. An electrical outlet box comprising a plurality of walls including a top wall, a bottom wall, a pair of opposing side walls connected to and extending between said top wall and said bottom wall, and a rear end wall cooperating with said top wall, said bottom wall and said side walls to define a generally rectangular box for receiving an electrical fixture therein and having a frontal opening, a cable receiving opening defined at least in part by one of said walls, and a cable clamping member supported on said outlet box and associated with said cable receiving opening, said clamping member having a body portion and including an air cap attached to said body portion at a region of weakening, said cable clamping member being movable relative to said outlet box from a cable receiving position to a clamping position wherein said clamping member clampingly engages a cable extending through said cable receiving opening to resist separation of the cable from said outlet box in response to force applied to the cable in a direction away from said outlet box, said air cap forming a closure for said cable receiving opening when said clamping member is in its cable receiving position, said air cap being adapted to break away from said body portion in response to inwardly directed force applied to said air cap.

4. An electrical outlet box as set forth in claim 3 including securing means for retaining said clamping member in said clamping position.

5. An electrical outlet box as set forth in claim 4 wherein said securing means is further characterized as means for moving said clamping means to said clamping position.

6. An electrical outlet box as set forth in claim 5 wherein said securing means comprising a threaded fastener threadably engaged with a wall of said outlet box.

* * * * *